A. M. KHUN.
SAFETY TRAP.
APPLICATION FILED NOV. 7, 1918.
1,356,530.  Patented Oct. 26, 1920.
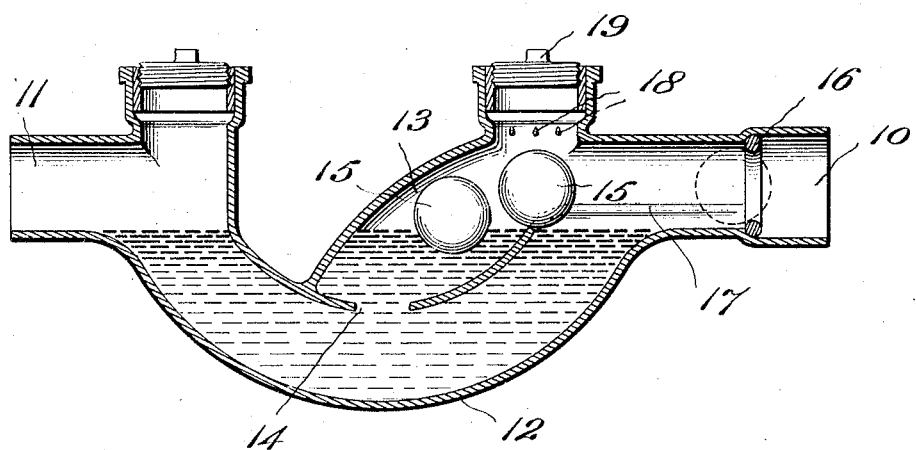
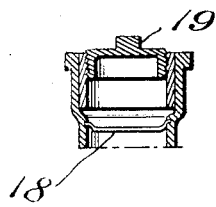
INVENTOR
Albert M. Khun,
BY
ATTORNEY

UNITED STATES PATENT OFFICE.

ALBERT M. KHUN, OF ELIZABETH, NEW JERSEY.

SAFETY-TRAP.

1,356,530.

Specification of Letters Patent.　　Patented Oct. 26, 1920.

Application filed November 7, 1918. Serial No. 261,439.

*To all whom it may concern:*

Be it known that I, ALBERT M. KHUN, a citizen of the United States, residing at Elizabeth, in the county of Union and State of New Jersey, have invented certain new and useful Improvements in Safety-Traps; and I do hereby declare the following to be a full, clear, and exact description of the invention, such as will enable others skilled in the art to which it appertains to make and use the same.

My present invention relates to a simple and effective means for preventing backing up of sewerage and the like into the drainage system of dwellings or other buildings.

The invention is shown in a preferred form in the accompanying drawing, in which Figure 1 is a longitudinal sectional view of my improved trap, and Fig. 2 is a similar view of the clean-out opening.

In this drawing, the interior main pipe leading outward from the building is represented at 10, and the branch sewer outside is shown at 11. These are connected by a trap 12 of usual form, but provided on its upper side with a pocket 13, having an opening 14 into the lower part of the trap 12.

This pocket is supplied with one or more (preferably two) balls 15, which may conveniently be common hollow rubber balls; and these are of such a size as not to pass through the opening into the house pipe.

On the house side of the trap, the drain pipe is provided with a restriction or collar 16, of such a size as to prevent passage of one of the balls 15, when pressed against it.

In normal use of the trap, the discharged water, etc., passes into the upper end of the trap, pushing the ball or balls 15 into the pocket 13. If there is any movement of water inward, however, part of it will rise through the opening 14, and will push the balls inward until the innermost ball is forced against the restriction or collar 16, as shown in dotted lines. This will serve, firmly and effectually to close the house pipes, and will prevent any backing up into the building.

The balls are preferably guided toward the house pipe by guiding ridges 17 cast into the sides of the trap. I prefer to use two balls instead of one, because this insures closure of the house pipe in case of a sudden back rush from the sewer.

Above the house side of the pocket 13 I place a clean-out opening preferably provided with three wires 18, bent at their ends and sprung into shallow sockets in the piping. By removing the cap 19 and springing these wires out of place, access can be had to both the pocket 13 and the space under it. The wires 18 prevent the balls 15 from rising into the clean-out opening.

It will be seen that by my arrangement, the exit tube 10 is prolonged in a portion which is curved first downward and then upward to form a trap 12 which holds the sealing liquid and that the down-curved portion is enlarged and divided by a partition forming the pocket 13, wherein the balls 15 are placed normally beyond and out of the way of the downrushing water coming from the tube 10. By this means I prevent the balls from forming any obstruction whatever to the normal passage of the water while they are at the same time incidentally available to close the exit tube 10 on occurrence of a big rush from the sewer.

What I claim is—

1. A safety trap comprising an exit tube curving first downward and then upward to hold the sealing liquid and having an enlargement beyond the entrance to the down-curved portion, separated by a partition over the down-curved portion forming a pocket and provided with an opening at the bottom of said pocket, a hand hole and cap over the edge of said partition affording access to both the pocket and trap, one or more floatable balls in said trap adapted to close the exit tube where it abuts on the trap, and means for guiding said ball or balls toward the point of closure; all arranged, substantially as described, to afford a clear passage for liquid out of contact with the closing ball or balls around the pocket containing them.

2. A safety trap of the character set forth generally in claim 1 hereof wherein the hand hole is provided with a grating of resilient guard wires bent at their ends and adapted to be sprung into sockets at the sides of the hand hole.

In testimony whereof I affix my signature.

ALBERT M. KHUN.